(12) United States Patent
Stokes et al.

(10) Patent No.: US 7,732,057 B2
(45) Date of Patent: Jun. 8, 2010

(54) FORMALDEHYDE-FREE PAPER BACKED VENEER PRODUCTS AND METHODS OF MAKING THE SAME

(75) Inventors: Bruce G. Stokes, Woodstock, GA (US); E. Craig Lyerly, Kernersville, NC (US)

(73) Assignee: Neenah Paper, Inc.

( * ) Notice: Subject to any disclaimer, the term of this patent is extended or adjusted under 35 U.S.C. 154(b) by 789 days.

(21) Appl. No.: 11/490,536

(22) Filed: Jul. 20, 2006

(65) Prior Publication Data

US 2008/0020200 A1 Jan. 24, 2008

(51) Int. Cl.
*B32B 27/32* (2006.01)
*B32B 27/38* (2006.01)
*B32B 27/00* (2006.01)
*B32B 29/00* (2006.01)

(52) U.S. Cl. .................. 428/537.5; 428/220; 428/332; 428/339; 428/413; 428/500

(58) Field of Classification Search ............... None
See application file for complete search history.

(56) References Cited

U.S. PATENT DOCUMENTS

| | | | |
|---|---|---|---|
| 3,556,932 A | 1/1971 | Coscia et al. | |
| 3,556,933 A | 1/1971 | Williams et al. | |
| 3,616,028 A | 10/1971 | Miller | |
| 3,700,623 A | 10/1972 | Keim | |
| 3,772,076 A | 11/1973 | Keim | |
| 3,855,158 A | 12/1974 | Petrovich | |
| 3,890,185 A | 6/1975 | Umazume | |
| 3,899,388 A | 8/1975 | Petrovich | |
| 3,985,937 A | 10/1976 | Fife | |
| 4,005,239 A | 1/1977 | Davis et al. | |
| 4,091,195 A | 5/1978 | Vitek | |
| 4,129,528 A | 12/1978 | Petrovich | |
| 4,147,586 A | 4/1979 | Petrovich | |
| 4,195,109 A | 3/1980 | Long | |
| 4,222,921 A | 9/1980 | Van Eanam | |
| 4,302,554 A | 11/1981 | Nabeta et al. | |
| 4,324,832 A | 4/1982 | Moroff et al. | |
| 4,543,284 A | 9/1985 | Baum | |
| 4,857,566 A * | 8/1989 | Helbling | 523/409 |
| 4,865,912 A | 9/1989 | Mitsumata | |
| 4,985,340 A | 1/1991 | Palazzotto et al. | |
| 5,140,086 A | 8/1992 | Hunter et al. | |
| 5,169,699 A | 12/1992 | Prince | |
| 5,194,310 A | 3/1993 | Lenderink | |
| 5,418,034 A | 5/1995 | McGuire, III | |
| 5,496,648 A | 3/1996 | Held | |
| 5,520,997 A | 5/1996 | Pourahmady et al. | |
| 5,565,507 A | 10/1996 | Marco et al. | |
| 5,573,640 A | 11/1996 | Frederick et al. | |
| 5,595,828 A | 1/1997 | Weber | |
| 5,618,632 A | 4/1997 | Watkins et al. | |
| 5,652,065 A | 7/1997 | Park et al. | |
| 5,698,061 A | 12/1997 | Maag | |
| 5,885,719 A | 3/1999 | Perrin | |
| 5,925,211 A | 7/1999 | Rakauskas | |
| 5,932,647 A | 8/1999 | Schilling et al. | |
| 6,004,648 A | 12/1999 | Snyder | |
| 6,352,784 B1 | 3/2002 | Katagiri | |
| 6,667,108 B2 | 12/2003 | Ellstrom | |
| 6,686,037 B2 | 2/2004 | Walter et al. | |
| 6,734,275 B2 | 5/2004 | Pirhonen et al. | |
| 6,878,795 B2 | 4/2005 | Marcinko et al. | |
| 6,887,537 B2 | 5/2005 | Bean et al. | |
| 6,887,583 B1 * | 5/2005 | Rakauskas | 428/528 |
| 6,900,249 B2 | 5/2005 | Mork et al. | |
| 7,019,072 B2 | 3/2006 | Choi et al. | |
| 2002/0005229 A1 | 1/2002 | Johnson | |
| 2002/0062911 A1 | 5/2002 | Merker et al. | |
| 2002/0168471 A1 | 11/2002 | Ljungar et al. | |
| 2002/0168508 A1 | 11/2002 | Reed et al. | |
| 2003/0039854 A1 | 2/2003 | Drewery et al. | |
| 2003/0108760 A1 | 6/2003 | Haas et al. | |
| 2003/0148135 A1 | 8/2003 | Ellstrom | |
| 2003/0221776 A1 | 12/2003 | Lakatosh et al. | |
| 2004/0089418 A1 | 5/2004 | Li | |
| 2004/0134606 A1 | 7/2004 | Tsutsui | |
| 2004/0170856 A1 | 9/2004 | Arndell et al. | |
| 2004/0247902 A1 | 12/2004 | Chuang | |
| 2005/0227104 A1 | 10/2005 | Kim et al. | |
| 2005/0257888 A1 | 11/2005 | Williamson et al. | |
| 2006/0035056 A1 | 2/2006 | Fuzzell | |
| 2006/0062966 A1 | 3/2006 | Kang et al. | |

FOREIGN PATENT DOCUMENTS

| | | |
|---|---|---|
| EP | 0806522 | 11/1997 |
| JP | 58007467 | 1/1983 |
| JP | 2000239646 | 9/2000 |

OTHER PUBLICATIONS

PCT International Search Report PCT/US2007/073664.

* cited by examiner

*Primary Examiner*—Sheeba Ahmed
(74) *Attorney, Agent, or Firm*—Dority & Manning, P.A.

(57) ABSTRACT

A paper backed veneer having a veneer laminated to a paper backing sheet saturated with a formaldehyde-free binder composition is generally disclosed. The formaldehyde-free binder composition includes a curable latex polymer and a crosslinking agent. The latex polymer can include functionalized groups, such as carboxyl groups, to aid curing. The crosslinking agent can be an epoxy resin. Also, a method of making paper backed veneers is generally disclosed.

18 Claims, 2 Drawing Sheets

FORMALDEHYDE-FREE PAPER BACKED VENEER PRODUCTS AND METHODS OF MAKING THE SAME

BACKGROUND OF THE INVENTION

Wood veneer is commonly applied to the outer surfaces of furniture, doors or other architectural woodwork to provide aesthetically pleasing wood grain appearance to such products at a relatively inexpensive cost. Typical base substrate materials can include other veneer sheets, paper, cloth, particleboard, fiberboard, reconstituted wood or fiber based board. The composite structure of a laminate panel constructed of a veneer face bonded to one or a plurality of base substrates will be hereinafter referred to as a "laminated veneer product." However, thin veneers can show imperfections of the base substrate, such as color show through or pitch bleed. In order to hide the imperfections of the base substrate, a paper backing sheet can be positioned between the veneer and the base substrate.

The manufacture of paper backed veneers typically involves the application of an adhesive resin to at least one surface of the paper backing sheet, followed by adhering the paper backing sheet to the inner facing surface of the veneer. Then, the paper backed veneer can be stacked and pressed to the base substrate(s) to produce a laminated veneer product. The pressing is generally accompanied by heating of the treated veneers in order to accelerate curing of the adhesive, although cold pressing has also been used.

Adhesives known in the art for manufacturing laminated veneer products are predominantly thermosetting adhesives. Aldehydes, especially formaldehyde based resins, are widely used in adhesive compositions. Typically, these adhesives compositions contain a substantial molar excess of formaldehyde. Some of this excess formaldehyde is released upon curing of the resin during the manufacture of the product, which can create environmental concerns in the manufacturing process. Also, the formaldehyde can continue to be released from these products even after the manufacturing process is completed. Thus, formaldehyde in the indoor air has been a major concern for many years. Commonly used aldehyde adhesives include phenol formaldehyde (resole) resins, commonly referred to as PF resins; urea formaldehyde resins (UF resins); melamine formaldehyde resins (MF); resorcinol formaldehyde resins (RF); and various combinations of the foregoing. Phenol formaldehyde (PF) based adhesives are the most widely used, especially for the manufacture of commodity laminated wood products, such as plywood. PF, and related resins types such as UF, RF, and MF, liberate water during the curing process, which limits the moisture content of the veneers that may be used with these kinds of adhesives.

A few formaldehyde-free adhesives have been introduced to the market place in an attempt to make a more environmental friendly adhesive. For example, polyisocyanate adhesives, such as methylene diphenyl diisocyanate, and ethyl carbamate (urethane) resins are formaldehyde-free adhesives that have been used. However, these adhesives are expensive, and thus undesirable for many practical uses of veneer laminate products.

As such, a need exists for a cost-effective, formaldehyde-free free adhesive capable of bonding layers of a veneer product together.

SUMMARY OF THE INVENTION

The present invention is directed to paper backed veneer products and processes for making the same. In one embodiment, a paper backed veneer comprising a veneer and a paper backing sheet is generally provided. The veneer defines an inner surface. The paper backing sheet is laminated to the inner surface of the veneer. The paper backing sheet comprises a cellulosic nonwoven web saturated with a formaldehyde-free binder composition. The binder composition comprises a curable latex polymer and a crosslinking agent. In one embodiment, the crosslinking agent is an epoxy resin. For example, the ratio of the amount of the curable latex polymer to the epoxy resin can be from about 10:1 to about 1:2 by weight.

The curable latex polymer can be selected from the group consisting of polyacrylates, styrene-butadiene copolymers, ethylene-vinyl acetate copolymers, nitrile rubbers, acrylonitrile-butadiene copolymers, poly(vinyl chloride), poly(vinyl acetate), ethylene-acrylate copolymers, vinyl acetate-acrylate copolymers, neoprene rubbers, trans-1,4-polychloroprenes, cis-1,4-polyisoprenes, butadiene rubbers, cis- and trans-1,4-polybutadienes, and ethylene-propylene copolymers. Also, the curable latex polymer can comprise a functionalized latex polymer, such as a latex polymer comprising carboxyl groups.

The paper backing sheet can be adhered to said inner surface of the veneer via a formaldehyde-free adhesive coating. For example, the formaldehyde-free adhesive coating can comprise a curable latex polymer and an epoxy resin. In one particular embodiment, the curable latex polymer of the formaldehyde-free binder composition has a glass transition temperature of less than 20° C., while the curable latex polymer of the formaldehyde-free adhesive coating has a glass transition temperature of greater than 20° C.

In another embodiment, the present invention is generally directed to a method of producing a laminated veneer product. For example, the method can comprise saturating a paper web with a binder composition. The binder composition comprises a curable latex polymer and an epoxy resin. A veneer is adhered to the paper web to form a paper backed veneer via a formaldehyde-free adhesive coating. The adhesive coating comprises a curable latex polymer and an epoxy resin. The paper backed veneer is adhered to a base substrate to form a veneer product. The veneer product is pressed at a sufficient pressure and temperature to cure the binder composition and the adhesive coating.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figure in which.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention relates to formaldehyde-free paper backed veneers and laminated veneer products produced from paper backed veneers. The paper backed veneers of the present invention include a veneer laminated to a paper backing sheet saturated with a formaldehyde-free binding composition. The binding composition includes a curable latex polymer and a crosslinking agent, such as an epoxy resin. In one embodiment, the paper backing sheet can be adhered to the veneer via a formaldehyde-free adhesive coating. The formaldehyde-free binder composition, and the optional formaldehyde-free adhesive coating, can provide sufficient lamination of the paper backing sheet to the veneer to avoid delamination, while avoiding any environmental problems of formaldehyde-based adhesives.

The paper backed veneers of the present invention can be used to add an aesthetically pleasing wood grain appearance to a variety of substrates in a relatively inexpensive manner. According to the present invention, a paper backing sheet is attached to the veneer such that the paper backing sheet is located between the veneer and a base substrate. The paper backing sheet provides additional structural support, as well as facilitating the ability of the veneer to attach (e.g., adhere) to the base substrate. Also, the paper backing sheet can help to hide imperfections in the base substrate to which the paper backed veneer is laminated.

Figure 1:
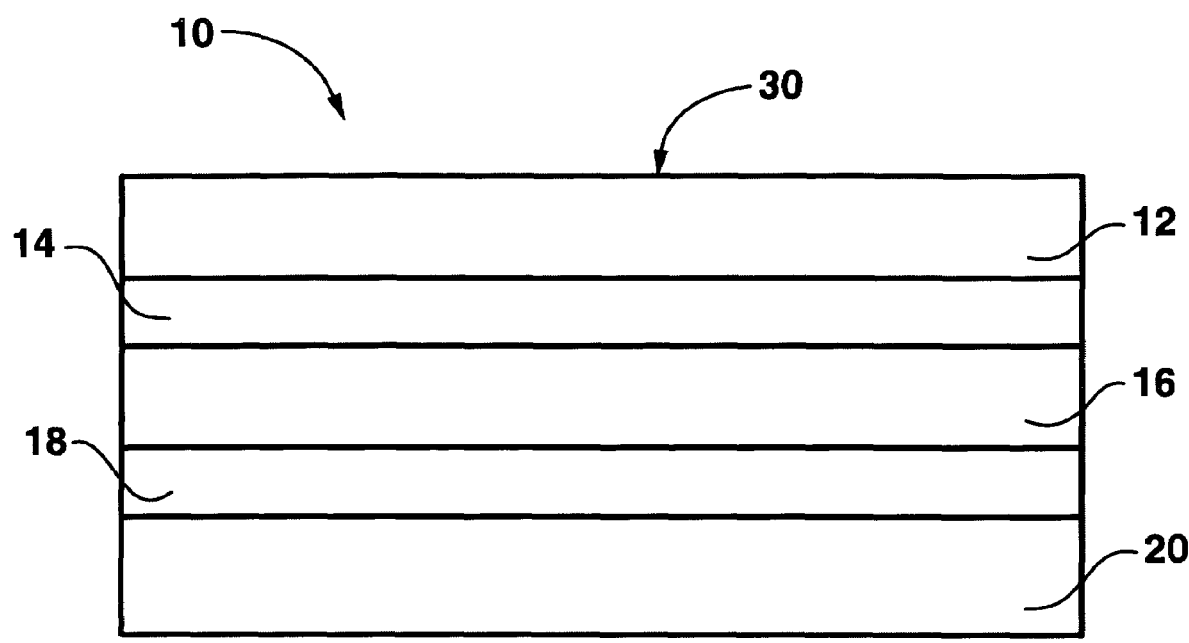
FIG. 1 is a cross-sectional view of a laminated veneer product of an exemplary embodiment of the present invention.

Referring to FIG. 1, a cross-section of an exemplary paper backed veneer 10 is shown having an outer veneer 12 adhered to a paper backing sheet 16 via adhesive layer 14. The veneer 12 defines an outer facing surface 30 that can have an aesthetically pleasing wood grain appearance. The paper backing sheet is then adhered to the base substrate 20 via a second adhesive layer 18. While adhesive layers 14 and 18 are depicted, it should be understood that in some embodiments, a binding composition saturating the paper backing sheet can be used instead of, or in addition to, the adhesive layers 14 and/or 18 to attach the paper backing sheet 16 to the veneer 12 and/or the base substrate 20.

The outer surface 30 provides a wood grain appearance to the base substrate 20, while hiding any imperfections in the base substrate. For example, when the base substrate is an engineered wood product (e.g., plywood, particleboard, fiberboard, laminated veneer lumber, etc.), the grain, color, and other visible characteristics of the engineered wood product can be hidden by the paper backed veneer. Also, the paper backed veneer can give a wood appearance to other, non-wood base substrates, such as sheet metal, plastic, and the like. Likewise, the veneer can give a solid wood appearance to an engineered wood product, which can inexpensively enhance the aesthetic appeal of the engineered wood product.

I. Veneer

As used herein, "veneer" generally refers to a ply of natural wood obtained from a log or other unit of natural lumber by any suitable means, but particularly by rotary peeling or linear slicing. Thus, a veneer has a substantially continuous grain. In most embodiments, "veneer" describes the outer most layer of a laminated veneer product, used to provide a wood grain appearance to the base substrate.

The wood veneer component may be selected from a variety of natural materials including, but not limited to, red oak, white oak, birch, maple, cherry, walnut, poplar, sweet gum, sycamore, tupelo, white gum, Carolina pine, ponderosa pine, lodgepole pine, Douglas fir, white fir, spruce, hemlock, rosewood, teak and mahogany. The veneers may be produced by standard veneer production techniques such as rotary slicing, rift-cut, quarter slicing, half-round slicing, plain slicing, and lengthwise slicing.

Generally, a veneer tends to be thin in the thickness dimension relative to one or both the length and width dimensions. However, the thickness of a veneer can vary depending upon the species of tree from which it was obtained. For a material such as oak, the veneer is typically at least 0.4 mm, while for cherry the veneer could be as thin as 0.2 mm. While in some embodiments, it is desirable to have as thin of veneer as possible, the veneer is sufficiently thick that it can be sanded without damaging it. From a practical standpoint, most veneers tend to have a thickness of 10 mm or less, such as less than 5 mm. When used as an outer surface to provide an aesthetically pleasing wood grain appearance to a product, the thickness of the veneer can be less than 2 mm, such as less than about 1 mm. In some particular embodiments, the veneer can be less than 0.5 mm, such as less than 0.25 mm. Preferably, the thickness of the veneer slice is between about 0.1 mm to about 6.5 mm, more preferably between 0.2 mm and 1.5 mm.

Suitable veneer materials are available from Clarke Veneers, Jackson Miss., as well as other distributors in North America through the HPVA (Hardwood Plywood and Veneer Association), Reston, Va.

In one embodiment, a surface treatment can be applied onto outer surface 30. The surface treatment can be a stain, paint, water-resistance coating, or other treatment. The type of treatment applied, if any, will depend on the end use of the paper backed veneer.

II. Paper Backing Sheet

The paper backing sheet laminated to the veneer can add strength and help attach the veneer to the base substrate to form the final laminated veneer product. Additionally, the paper backing sheet helps hide various imperfections of the base substrate, such as color show, and pitch bleed through to the veneer. The paper backing sheet can also balance or offset any warping of the veneer, especially during the heat curing and/or pressing of the veneer during lamination which can cause evaporation of moisture in the veneer and/or adhesive.

The presence of a paper backing sheet can be especially useful when the veneer is very thin (e.g., less than about 0.5 mm, less than about 0.4 mm, or less than about 0.2 mm), when imperfections of the base substrate are more likely to show through the veneer.

According to the present invention, the paper backing sheet is saturated with a formaldehyde-free binder composition, resulting in a more environmental friendly laminated veneer product. As used herein, "free" means that the designated compound is not present in the resulting composition in any amount; however, in some instances, an insignificant trace amount may be present in the resulting composition. For example, less than about 0.1% by weight of the designated compound can present in the resulting composition. Thus, the term "formaldehyde-free" means that only an insignificant trace amount (e.g., less than about 0.1% by weight) of formaldehyde molecules is present in the composition, preferably no formaldehyde molecules.

In accordance with the present invention, the binder composition includes a curable latex polymer. As used herein, the term "latex polymer" refers to an emulsion of the polymer in a solvent (typically water). The curable latex polymers are configured to cure upon the application of heat and/or pressure creating a stronger form of the polymer material, such as a crosslinked 3-dimensional structure.

Suitable latex polymers include, but are not limited to polyacrylates, including polymethacrylates, poly(acrylic acid), poly(methacrylic acid), and copolymers of the various acrylate and methacrylate esters and the free acids; styrene-butadiene copolymers; ethylene-vinyl acetate copolymers; nitrile rubbers or acrylonitrile-butadiene copolymers; poly (vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

In one embodiment, the latex polymer can include functionalized groups configured to facilitate curing of the latex polymer. For example, the latex polymer can include, but are not limited to, carboxyl groups, amine groups, and pyridyl groups. Without wishing to be bound by theory, it is believed that these functionalized groups can facilitate the curing of the latex polymer, as well as the crosslinking, by the presence of the polar groups on the latex polymer.

In one particular embodiment, a carboxylated latex polymer is present in the binder composition. The carboxylated latex polymer can be a copolymer product of the polymerization of a vinyl aromatic monomer and an unsaturated carboxylic acid monomer. The copolymer may further comprise a diene monomer.

Useful vinyl aromatic monomers include, but are not limited to, styrene, alpha-methylstyrene, ethylstyrene, dimethylstyrene, t-butylstyrene, vinylnaphthalene, methoxystyrene, cyanostyrene, acetylstyrene, monochlorostyrene, dichlorostyrene, and other halostyrenes, and mixtures thereof. The vinyl aromatic monomer may be present in any effective amount, such as greater than 0% to about 75% by weight, based on the total weight of the polymer resin. In some embodiments, the vinyl aromatic monomer is present in amounts of from about 35% to about 70% by weight. For example, in one particular embodiment, the vinyl aromatic monomer can be present from about 55% to about 60% by weight.

The ethylenically unsaturated carboxylic acid may be a monocarboxylic acid, or a dicarboxylic acid or a polycarboxylic acid, such as, for example, acrylic acid, methacrylic acid, fumaric acid, maleic acid, itaconic acid, derivatives thereof, and mixtures thereof. The ethylenically unsaturated carboxylic acid monomer may be present in any amount, such as from about 0.5% to about 25% by weight, based on the total weight of the polymeric resin. In one embodiment, the ethylenically unsaturated acid monomer is present in amounts of from about 1% to about 5% by weight, such as from about 3% to about 5% by weight, based on the total weight of the copolymer.

Suitable diene monomers include, but are not limited to, butadiene, isoprene, divinylbenzene, derivatives thereof and mixtures thereof. In one particular embodiment, the diene monomer can be a 1,3-butadiene monomer. When present, the diene monomer may be present from greater than 0% to about 85% by weight, and in one embodiment is present from about 30% to about 65% by weight, based on the total weight of the polymer resin. For instance, in one particular embodiment, the diene monomer can be present from about 40% to about 45% by weight.

The latex polymer may also comprise additional ethylenically unsaturated monomeric components. Specific examples of such ethylenically unsaturated compounds include methyl methacrylate, ethyl acrylate, butyl acrylate, hexyl acrylate, 2-ethylhexyl acrylate, lauryl methacrylate, phenyl acrylate, acrylonitrile, methacrylonitrile, ethyl-chloroacrylate, diethyl maleate, polyglycol maleate, vinyl chloride, vinyl bromide, vinylidene chloride, vinylidene bromide, vinyl methyl ketone, methyl isopropenyl ketone, and vinyl ethyl ester. Derivatives thereof and/or mixtures thereof may be included.

The latex polymer of the formaldehyde-free binder composition can have a glass transition temperature ($T_g$) of less than about 20° C. For example, the glass transition temperature of the latex polymer of the binder composition can be less than about 10° C., such as less than about 5° C.

In one particular embodiment, a styrene-butadiene latex including carboxyl groups can be included in the binder composition, such as the carboxylated styrene-butadiene latex sold as DL-240NA by Dow Reichhold Specialty Latex, LLC of Research Triangle Park, N.C., which has a $T_g$ of about 2° C. Without wishing to be bound by theory, carboxylation of the latex polymer is believed to provide polar functional groups along the polymer chain. These polar functional groups can increase the ability of the latex polymer to crosslink upon curing, which can result in a strengthened, bonded polymer matrix formed upon curing.

Another class of the functionalized latex polymers includes latex polymers having pyridyl groups, such as vinylpyridines and their respective alkyl derivatives. When utilized, the pyridyl functionalized monomer is generally present in the functionalized latex polymer up to about 45% by weight, such as from about 5% to about 40%. An exemplary vinylpyridine/latex copolymer is available under the designation LVP-4668® from Goodyear Chemical Company, which is believed to be a 40% solids dispersion in water of styrene/butadiene/vinylpyridine in a ratio of about 45:45:10.

Yet another class of functionalized latex polymers include ethylenically unsaturated compounds having a pendant amide or amide derivative group. For example, one suitable monomer can include an acrylamide. In this embodiment, the amide functionalized monomer can be present in an amount up to about 40% by weight, such as from about 0.5% to about 30%.

Typically, such monomers are copolymerized in an aqueous emulsion containing surfactants and modifiers under conditions of time, temperature, pressure, and agitation in accordance with well known principles of emulsion polymerization.

Additionally, different types of functionalized monomers can be utilized in the same latex polymer. For example, the latex polymer can include both carboxyl groups and pyridyl groups.

The latex polymer can be provided in an emulsion, typically an aqueous emulsion. The solids content of the latex polymer emulsion can be from about 1% by weight to about 65% by weight, such as from about 10% to about 60%. In one particular embodiment, the solids content of the latex polymer emulsion is from about 40% to about 55% by weight.

In most embodiments, the latex polymer is crosslinked upon curing. For example, the latex polymer may be self-crosslinking, with the aid of a crosslinking agent. Alternatively, the latex polymer can be crosslinked to a crosslinking agent, such as a resin.

For example, in one particular embodiment, the latex polymer is crosslinked to an epoxy resin. The level of epoxy resin employed can vary over a wide range depending upon the types of epoxy resin and latex polymer used. For example, the epoxy resin can be from about 0.1% to about 60% by weight of the binder composition, such as from about 10% to about 50%. Thus, the ratio of the latex polymer to epoxy resin can be from about 10:1 to about 1:2 by weight. Preferably, the ratio of the latex polymer to epoxy resin is from about 5:1 to about 1:1, by weight.

As used herein, "epoxy resin" includes any compound which possesses more than one 1,2-epoxy group. In general, the epoxy resin component is saturated or unsaturated aliphatic or cycloaliphatic, aromatic or heterocyclic and can be substituted or unsubstituted. The epoxy resins may be selected from the polyglycidyl ethers of bisphenol compounds, the polyglycidyl ethers of a novolac resin, and the polyglycidyl ethers of a polyglycol. For example, the epoxy resin can be polyglycidyl ethers of bisphenol compounds. Suitable polyglycidyl ethers can include bisphenol A or bisphenol F. In one particular embodiment, the epoxy resins may be formed as the reaction products of epichlorohydrin and bisphenol A or bisphenol F or derivatives thereof. For example, a suitable epoxy resin is available under the name EPI-REZ® 3510-W-60 Resin from Hexion Specialty Chemicals of Houston, Tex., which is believed to be a waterborne bisphenol-A-(epichlorohydrin) epoxy resin.

Other useful epoxy resins include, but are not limited to, epoxy cresol-novolak resins; epoxy phenol-novolak resins; poly nuclear phenol-glycidyl ether-derived resins, such as the tetraglycidyl ether of tetrakis(4-hydroxyphenyl) ethane; resins containing an aromatic amine backbone, such as triglycidyl p-aminophenol-derived resins and triglycidyl triazine-derived resins such as triglycidyl isocyanurate.

Additionally, an antioxidant compound can be included in the binder composition. Antioxidants help inhibit oxidation of the binder composition during the curing process. Oxidation can discolor the binder composition and degrade its final physical properties. Examples of antioxidants include, but are not limited to, substituted phenolic compounds such as butylated dihydroxyanisole, di-tert-butyl-p-cresol, and propyl gallate. Additional examples of antioxidants include aromatic amines, such as, di-beta-naphthyl-para-phenylenediamine and phenyl-beta-naphthylamine. If used, the antioxidants may be included in the formulation at a concentration of greater than about 0 parts per one hundred parts solids, based on the weight of the latex polymer. For example, the antioxidants may be included in the formulation at a concentration of less than about 10% by weight, preferably, less than about 5%, more preferably, less than about 2%, based on the weight of the latex polymer. In one particular embodiment, a phenol-type antioxidants can be included in the binder composition, such as the phenol-type antioxidant available under the name Bostex 24 from Akron Dispersions of Akron, Ohio.

In addition to a latex polymer, the binder composition may also contain a heat-sealable polymer to help improve the peel strength of the resulting veneer product during use. Examples of such heat-sealable polymers include, but are not limited to, homopolymers and heteropolymers of lower alkenes, e.g., ethylene and/or propylene. Specific examples of such heat-sealable polymers are polyethylene, polypropylene, ethylene acrylic acid, and ethylene vinyl acetate. One particularly desirable heat-sealable polymer is ethylene acrylic acid, such as commercially available under the name "Michem® Prime 4983R" from Michelman, Inc. Michem® Prime 4983R is a dispersion of Dow PRIMACOR® 5980I (copolymer of ethylene and acrylic acid that has an ethylene content of approximately 80%). Other suitable heat-sealable polymers may be described in U.S. Pat. No. 6,887,537 to Bean, et al., which is incorporated herein in its entirety by reference thereto for all purposes. When employed, heat-sealable polymers may constitute from about 35 wt. % to about 85 wt. %, in some embodiments, from about 40 wt. % to about 70 wt. %, and in some embodiments, from about 50 wt. % to about 60 wt. % of the binder composition. Likewise, latex polymers may constitute from about 25 wt. % to about 75 wt. %, in some embodiments from about 30 wt. % to about 60 wt. %, and in some embodiments, from about 40 wt. % to about 50 wt. % of the binder composition.

Additional materials, such as particles, fillers, emulsifying agents and the like can be included in the binder composition, if desired. Suitable particles may include, for instance, silica or silicates, clays, borates, and the like. Clays may include, without limitation, kaolin minerals (including kaolinite, dickite and nacrite), talc, serpentine minerals, mica minerals (including illite), chlorite minerals, sepiolite, palygorskite, bauxite, etc. Another suitable clay is a smectite type clay. Examples of suitable smectites are, without limitation, montmorillonite (sometimes referred to as bentonite), beidellite, nontronite, hectorite, saponite, sauconite and laponite. Bentonite is an example of a naturally occurring combination of clay particles that are rich in montmorillonite and may also contain other smectites and non-clay mineral constituents. Consequently, montmorillonites or their mixtures with other smectites are often referred to simply as bentonite. Bentonite clays are fine crystals or particles, usually plate-like in shape, with a lateral dimension up to 2 μm and a thickness in a range of a few to tens of nanometers (nm).

Of course, in addition the components identified above, the binder composition may also include other additives for providing the binder composition with desirable qualities. Examples include, but are not limited to, chemicals for pH adjustment, surfactants, etc. For example, in one embodiment, ammonia can be present in the adhesive coating. Trisodium phosphate can be included in the binder composition to help control the pH of the emulsion, as an emulsifier, and/or as a thickening agent.

The binder composition can be applied to the paper backing sheet according to any method, including before, after, or during the paper making process. Preferably, the binder composition is saturated into the fibrous web after it is formed. Any known saturation technique may be employed, such as brushing, flooded nip saturation, doctor blading, spraying, and direct and offset gravure coating. For example, the web may be exposed to an excess of the solution and then squeezed. The squeezing of excess binder from the web may be accomplished by passing the web between rollers. If desired, the excess binder may be returned to the supply for further use. After squeezing out excess material, the saturated web may then be dried. Other suitable techniques for impregnating a web with a binder composition are described in U.S. Pat. No. 5,595,828 to Weber and U.S. Patent Application Publication No. 2002/0168508 to Reed, et al., which are incorporated herein in their entirety by reference thereto for all purposes. The amount of the binder composition applied may vary depending on the desired properties of the web, such as the desired permeability. Typically, the binder composition is present at an add-on level of from about 10% to about 90%, in some embodiments from about 20% to about 70%, and in some embodiments, from about 30% to about 60%. The add-on level is calculated, on a dry weight basis, by dividing the dry weight of binder composition applied by the dry weight of the web before treatment, and multiplying the result by 100.

After saturation, the paper backing sheet can be dried to remove the solvent from the binder composition. For example, the saturated sheet may be heated to a temperature of at least 100° C., and in some embodiments at least about 150° C., such as at least about 200° C. Suitable drying techniques may include heating with, for example, a conventional oven, microwave, forced air, heated roll, can, thru-air drying, and so forth.

The paper backing sheet may generally be formed from a variety of different materials as is well known in the art, such as nonwoven webs, paper, and so forth. In one embodiment, for example, the paper backing sheet contains a fibrous web formed from a cellulosic fibrous material. As used herein, the term "cellulosic fibrous material" generally refers to a material that contains wood based-pulps or other non-wood derived fiber sources. The pulp may be a primary fibrous material or a secondary fibrous material ("recycled"). Sources of pulp fibers include, by way of example, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton liners. Softwoods and hardwoods are the more commonly used sources of cellulose fibers. Examples of softwoods include, by way of illustration only longleaf pine, shortleaf pine, loblolly pine, slash pine, Southern pipe, black spruce, white spruce, jack pine, balsam fir, douglas fir, western hemlock, redwood, and red cedar. Examples of hardwoods include, again by way of illustration only, aspen, birch, beech, oak, maple, eucalyptus, and gum. Specific examples of such pulp fibers include softwood pulps available under the trade designation Bowater NBSK from Bowater, Inc. of Greenville, S.C., and INTERNATIONAL PINE® from International Paper Company. Other cellulosic fibers that may be used in accordance with the present invention include eucalyptus fibers, such as Primacell Eucalyptus, available from Klabin Riocell, and other hardwood pulp fibers available under the trade designations Sappi NBSK from Sappi Limited of Cloquet, Minn., St. Croix hardwood available from Georgia-Pacific Corporation, and Leaf River hardwood available from Georgia-Pacific Corporation.

The pulp fibers may generally be chemical or mechanical pulp. Chemical pulp refers to fibrous materials from which most non-cellulose components are removed by chemical pulping without substantial mechanical post-treatment. Sulfite or sulfate (Kraft) chemical processes, for example, involve the dissolution of the lignin and hemi-cellulose components from the wood to varying degrees depending on the desired application. Mechanical pulp refers to fibrous materials made of wood processed by mechanical methods. Mechanical pulp is subdivided into the purely mechanical pulps (e.g., groundwood pulp and refiner mechanical pulp) and mechanical pulps subjected to chemical pretreatment (e.g., chemimechanical pulp or chemithermomechanical pulp). Synthetic cellulose-containing fibers may also be used, such as cellulosic esters, cellulosic ethers, cellulosic nitrates, cellulosic acetates, cellulosic acetate butyrates, ethyl cellulose, regenerated celluloses (e.g., viscose, rayon, etc.).

Although not required, the cellulosic fibrous material is typically a chemical pulp. Examples of such chemical pulps include, for instance, sulfite pulps, Kraft pulps (sulfate), soda pulps (cooked with sodium hydroxide), pulps from high-pressure cooking with organic solvents, and pulps from modified processes. Sulfite and Kraft pulps differ considerably in terms of their fibrous material properties. The individual fiber strengths of sulfite pulps are usually much lower than those of Kraft pulps. The mean pore width of the swollen fibers is also greater in sulfite pulps and the density of the cell wall is lower compared to Kraft pulps, which simultaneously means that the cell-wall volume is greater in sulfite pulps. Due to their higher strength, lower pore width, and higher density, Kraft pulps are typically employed in the present invention. While the present invention has applicability to any of the above chemical pulping processes, it is particularly useful with the Kraft process.

If desired, synthetic fibers may also used in conjunction with the cellulosic fibers to increase the tear resistance of the fibrous web. Examples of such synthetic fibers may include, for instance, polyolefins (e.g., polyethylene, polypropylene, polybutylene, etc.); polytetrafluoroethylene; polyesters (e.g., polyethylene terephthalate); polyvinyl acetate; polyvinyl chloride acetate; polyvinyl butyral; acrylic resins (e.g., polyacrylate, polymethylacrylate, polymethylmethacrylate, etc.); polyamides (e.g., nylon 6, nylon 6/6, nylon 4/6, nylon 11, nylon 12, nylon 6/10, and nylon 12/12); polyvinyl chloride; polyvinylidene chloride; polystyrene; polyvinyl alcohol; polyurethanes; polylactic acid; and so forth. The synthetic fibers may be monocomponent or multicomponent fibers. One example of a multicomponent fiber is comprised of two fibers having differing characteristics combined into a single fiber, commonly called a biocomponent fiber. Bicomponent fibers generally have a core and sheath structure where the core polymer has a higher melting point than the sheath polymer. Other bicomponent fiber structures, however, may be utilized. For example, bicomponent fibers may be formed with the two components residing in various side-by-side relationships as well as concentric and eccentric core and sheath configurations. One particular example of a suitable bicomponent fiber is available from KoSa under the designation CELBOND® T-255. CELBOND® T-255 is a synthetic polyester/polyethylene bicomponent fiber capable of adhering to cellulosic fibers when its outer sheath is melted at a temperature of approximately 128° C. When utilized, the synthetic fibers typically constitute from about 0.1% to about 30%, in some embodiments from about 0.1% to about 20%, and in some embodiments, from about 0.1% to about 10% of the dry weight of the web.

Particularly when natural fibers are employed, the fibrous material is generally placed in a conventional papermaking fiber stock prep beater or pulper containing a liquid, such as water. The fibrous material stock is typically kept in continued agitation such that it forms a suspension. If desired, the fibrous material may also be subjected to one or more refinement steps to provide a variety of benefits, including improvement of the tensile and porosity properties of the fibrous web. Refinement results in an increase in the amount of intimate contact of the fiber surfaces and may be performed using devices well known in the art, such as a disc refiner, a double disc refiner, a Jordan refiner, a Claflin refiner, or a Valley-type refiner. Various suitable refinement techniques are described, for example, in U.S. Pat. No. 5,573,640 to Frederick, et al., which is incorporated herein in its entirety by reference thereto for all purposes. The level of fiber degradation imparted by refinement may be characterized as "Canadian Standard Freeness" (CSF) (TAPPI Test Methods T-2270M-94). For example, 800 CSF represents a relatively low amount of degradation, while 400 CSF represents a relatively high amount of degradation. In most embodiments of the present invention, the fibers are refined to about 400 to about 800 CSF, and in some embodiments, from about 600 CSF to about 750 CSF.

The resulting fibrous suspension may then be diluted and readied for formation into a fibrous web using conventional papermaking techniques. For example, the web may be formed by distributing the suspension onto a forming surface (e.g., wire) and then removing water from the distributed suspension to form the web. This process may involve transferring the suspension to a dump chest, machine chest, clean stock chest, low density cleaner, headbox, etc., as is well known in the art. Upon formation, the fibrous web may then be dried using any known technique, such as by using convection ovens, radiant heat, infrared radiation, forced air ovens, and heated rolls or cans. Drying may also be performed by air drying without the addition of thermal energy.

Various additives may be applied to the cellulosic fibrous material during formation of the fibrous web. For example, wet-strength agents may be used to improve the strength properties of the web during formation. The wet-strength agents may be present in an amount from about 0.001 wt. % to about 5 wt. %, in some embodiments from about 0.01 wt. % to about 2 wt. %, and in some embodiments, from about 0.1 wt. % to about 1 wt. %, based on the dry weight of the fibers. Wet strength agents are typically water soluble, cationic oligomeric or polymeric resins that are capable of bonding with the cellulosic fibers. For example, some suitable wet-strength agents are polyamine-epichlorohydrin, polyamide epichlorohydrin or polyamide-amine epichlorohydrin resins (collectively "PAE" resins). Examples of these materials are described in U.S. Pat. No. 3,700,623 to Keim and U.S. Pat. No. 3,772,076 to Keim, which are incorporated herein in their entirety by reference thereto for all purposes. Suitable PAE resins are available from Hercules, Inc. of Wilmington, Del. under the designation "KYMENE®" (e.g., KYMENE® 557H or 557 LX). KYMENE® 557 LX, for example, is a polyamide epicholorohydrin polymer that contains both cationic sites, which may form ionic bonds with anionic groups on the pulp fibers, and azetidinium groups, which may form covalent bonds with carboxyl groups on the pulp fibers and crosslink with the polymer backbone when cured. Other suitable polyamide-epichlorohydrin resins are described in U.S. Pat. No. 3,885,158 to Petrovich; U.S. Pat. No. 3,899,388 to Petrovich; U.S. Pat. No. 4,129,528 to Petrovich; U.S. Pat. No. 4,147,586 to Petrovich; and U.S. Pat. No. 4,222,921 to van Eanam, which are incorporated herein in their entirety by reference thereto for all purposes.

Of course, other wet strength agents may also be employed in certain embodiments of the present invention. For example, other suitable wet strength agents may include dialdehyde starch, polyethylene imine, mannogalactan gum, glyoxal, and dialdehyde mannogalactan. Particularly useful wet-strength agents are water-soluble polyacrylamide resins available from Cytec Industries, Inc. of West Patterson, N.J. under the designation PAREZ® (e.g., PAREZ® 631NC). The PAREZ® resins are formed from a polyacrylamide-glyoxal polymer that contains cationic hemiacetal sites. These sites may form ionic bonds with carboxyl or hydroxyl groups present on the cellulosic fibers to provide increased strength to the web. Because the hemiacetal groups are readily hydrolyzed, the wet strength provided by the resins is primarily temporary. Such resins are believed to be described in U.S. Pat. No. 3,556,932 to Coscia, et al. and U.S. Pat. No. 3,556,933 to Williams, et al., which are incorporated herein in their entirety by reference thereto for all purposes.

The basis weight of the paper backing sheet can be any basis weight useful for providing a paper backing sheet, such as from about 10 gsm to about 200 gsm or greater. For example, in some embodiments, the paper backing sheet can have a basis weight of from about 20 gsm to about 85 gsm, such as from about 25 gsm to about 65 gsm. Also, the paper backing sheet can have any thickness useful for providing a paper backing sheet, such as up to about 0.5 millimeters. For example, the paper backing sheet can have a thickness of from about 0.05 millimeters to about 0.4 millimeters, such as from about 0.1 millimeters to about 0.3 millimeters.

Various other additives may also be employed in the fibrous web. The additives may be applied directly to the web or fibers, in conjunction with the binder composition or optional adhesive coating, or as a separate coating. By way of example, suitable additives may include antifoaming agents, pigments, processing aids, and dispersing agents. Examples of antifoaming agents include, but are not limited to, products such as NALCO® 7518 available from Nalco Chemical Company or DOW Corning® Antifoam available from Dow Corning Corporation. Dispersing agents or surfactants include, but are not limited to, products such as TAMOL® 731A available from Rohm & Haas Co., PLURONIC® F108 available from BASF Corporation, SMA® 1440 Resin available from ATOFINA Chemicals, Inc., and TERGITOL® 15S available from Union Carbide Corp. Examples of processing aids may include, but are not limited to, products such as NOPCOTE® DC-100A available from Geo Specialty Chemicals, Inc., SCRIPSET® 540 available from Solutia, Inc. and AQUAPEL® 752 available from Hercules Incorporated. Examples of pigments used to increase opacity include but are not limited to, titanium dioxide such as TI-PURE® Rutile Titanium Dioxide available from E.I. Du Pont De Nemours & Co. and kaolin pigments, which are available from a variety of manufacturers. A wide range of pigments and dyes may also be added to impart color to the saturated sheet. The foregoing list of categories of additives and examples of categories is provided by way of example and is not intended to be exhaustive.

III. Adhesive Coating

In some embodiments, a formaldehyde-free adhesive coating can be applied to at least one surface of the paper backing sheet to help adhere the paper backing sheet to the inner facing surface of the veneer during the lamination process. The adhesive coating of the present invention can be sufficiently strong enough to adhere to the veneer to the paper backing sheet without delamination.

The formaldehyde-free adhesive coating includes a curable latex polymer and a crosslinking agent, such as described above with reference to the binder composition. Also, the adhesive coating can include any of the components described above with reference to the binder composition.

For example, suitable latex polymers include, but are not limited to polyacrylates, including polymethacrylates, poly (acrylic acid), poly(methacrylic acid), and copolymers of the various acrylate and methacrylate esters and the free acids; styrene-butadiene copolymers; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

In one particular embodiment, the latex polymer can include functionalized groups configured to facilitate curing of the latex polymer. For example, the latex polymer can include, but are not limited to, carboxyl groups, amine groups, and pyridyl groups, such as those described above.

The glass transition temperature of the latex polymer in the adhesive coating can be substantially higher than the glass transition temperature of the latex polymer included in the binder composition. For example, the glass transition temperature of the latex polymer in the adhesive coating can be greater than about 20° C., such as greater than about 35° C. In one particular embodiment, the glass transition temperature of the adhesive coating can be greater than about 40° C.

In one embodiment, the latex polymer of the adhesive coating includes a carboxylated latex polymer of a vinyl aromatic monomer and a diene monomer. The vinyl aromatic monomer may be present in any effective amount, such as greater than 0% to about 85% by weight. For example, in some embodiments, the vinyl aromatic monomer is present in amounts of from about 50% to about 80% by weight, such as from about 70% to about 76%. The diene monomer may be present from greater than 0% to about 50% by weight, and in one embodiment from about 20% to about 30% by weight. The unsaturated carboxylic acid may be present in any amount, such as from about 0.5% to about 25% by weight, such as from about 1% to about 5% by weight.

For example, a carboxylated styrene-butadiene latex can be used, such as the carboxylated styrene-butadiene latex sold as DL-242NA by Dow Reichhold Specialty Latex, LLC of Research Triangle Park, N.C. which has a $T_g$ of about 45° C. Without wishing to be bound by theory, carboxylation of the latex polymer is believed to provide polar function groups along the polymer chain. These polar functional groups can increase the ability of the latex polymer to crosslink upon curing, which can result in a strengthened, bonded polymer matrix formed upon curing.

In most embodiments, the latex polymer is crosslinked upon curing. For example, the latex polymer may be self-crosslinking, with the aid of a crosslinking agent. Alternatively, the latex polymer can be crosslinked to a crosslinking agent, such as a resin. For example, in one particular embodiment, the latex polymer is crosslinked to an epoxy resin, such as described above.

Additionally, an antioxidant compound can be included in the adhesive coating, such as those described above. Of course, in addition the components identified above, the adhesive coating may also include other additives for providing the coating with desirable qualities. Examples include, but are not limited to, chemicals for pH adjustment, surfactants, etc. For example, in one embodiment, ammonia can be present in the adhesive coating. Trisodium phosphate can be included in the adhesive coating to help control the pH of the emulsion, as an emulsifier, and/or as a thickening agent.

The adhesive coating can be applied to the paper backing sheet, to the veneer, to the base substrate, or combinations thereof. However, the adhesive coating is preferably applied to the paper backing sheet. As such, the coating techniques described below are directed to coating at least one surface of the paper backing sheet, but can apply to the veneer or base substrate.

The adhesive coating of the present invention may generally be applied to the paper backing sheet using any technique known in the art. For instance, the components of the coating may be initially dissolved or dispersed in a solvent to form a coating formulation that may be easily applied to the paper backing sheet. Any solvent capable of dispersing or dissolving the components is suitable, for example water; alcohols such as ethanol or methanol; dimethylformamide; dimethyl sulfoxide; hydrocarbons such as pentane, butane, heptane, hexane, toluene and xylene; ethers such as diethyl ether and tetrahydrofuran; ketones and aldehydes such as acetone and methyl ethyl ketone; acids such as acetic acid and formic acid; and halogenated solvents such as dichloromethane and carbon tetrachloride; as well as mixtures thereof. In one particular embodiment, for example, water is used as the solvent so that an aqueous coating formulation is formed. Although the actual concentration of solvent (e.g., water) employed may vary, it is nonetheless typically present in an amount from about 10 wt. % to about 80 wt. %, in some embodiments from about 20 wt. % to about 70 wt. %, and in some embodiments, from about 25 wt. % to about 60 wt. % of the coating formulation. The amount of the adhesive and other components added to the coating formulation may vary depending on the wet pick-up of the application method utilized and target add-on level.

Any conventional application technique may be used to apply the adhesive coating to the paper backing sheet, such as bar, roll, knife, curtain, print (e.g., rotogravure), spray, slot-die, drop-coating, or dip-coating techniques. The coating may be applied to one or both surfaces of the substrate. For example, the adhesive coating may be present on only one surface of the paper backing sheet. The adhesive coating may cover an entire surface of the paper backing sheet. Alternatively, the adhesive coating may cover less than 100% of one or more surfaces of the substrate.

Regardless of the manner in which the coating is applied, the resulting coated paper backing sheet is typically dried at a certain temperature to remove the solvent from the coating. For example, the coated sheet may be heated to a temperature of at least about 100° C., in some embodiments at least about 150° C., and in some embodiments, at least about 200° C. Suitable drying techniques may include heating with, for instance, a convection oven, microwave, forced air oven, heated roll or can, and so forth.

The add-on level of the adhesive coating (after drying) may vary as desired. The "add-on level" is determined by subtracting the weight of the uncoated paper backing sheet from the weight of the coated paper backing sheet (after drying), dividing this calculated weight by the weight of the uncoated paper backing sheet, and then multiplying by 100%. Lower add-on levels may optimize certain properties (e.g., flexibility), while higher add-on levels may optimize the strength of the adhesive bonding. In some embodiments, for example, the add-on level is from about 20% to about 150%, in some embodiments from about 40% to about 100%, and in some embodiments, from about 60% to about 80%. The thickness of the adhesive coating may also vary. For example, the thickness may range from about 0.01 millimeters to about 5 millimeters, in some embodiments, from about 0.01 millimeters to about 3 millimeters, and in some embodiments, from about 0.1 millimeters to about 2 millimeters. In some cases, a relatively thin coating may be employed (e.g., from about 0.01 millimeters to about 0.5 millimeters).

IV. Laminated Veneer Product

The paper backed veneers of the present invention can be used to make a number of different laminated veneer products. As discussed above, the paper backed veneer can be attached to any suitable substrate to add a wood grain appearance to the substrate, while hiding the substrate's color and any surface imperfections. The laminated veneer products can exhibit the desirable appearance and characteristics of the veneer material while providing a cost savings over a solid structure made entirely of the veneer material. For example, a natural hardwood veneer, such as oak, may be secured to a less expensive substrate, such as fiberboard, to produce a laminated veneer product that resembles a pure oak product.

The paper backed veneer can be attached to the base substrate via any method. For example, the paper backed veneer can be adhered to the base substrate via an adhesive coating. After attachment, the resulting veneer product can be pressed at a sufficient pressure, temperature, and time in order to cure the adhesive coating, as well as the binder composition saturating the paper backing sheet. For example, the paper backed veneer attached to the base substrate can be pressed at a pressure of greater than about 100 psi, such as greater than about 140 psi, such as from about 150 psi to about 200 psi. The temperature of the hot press can be greater than about 100° C., such as greater than about 125° C. Also, the time that the paper backed veneer and base substrate are pressed can be less than about 10 minutes, such as less than about 5 minutes. However, one of ordinary skill in the art can vary the time, temperature, and pressure in order to maximize the degree of adhesion for the particular adhesive used.

In one particular embodiment, the base substrate of the laminated veneer product is an engineered wood product, which can include but is not limited to, laminated veneer lumber (LVL), plywood, and fiberboard.

Plywood products may be relatively thin laminates, typically about an inch or less in final thickness. Generally, the plywood products are made from relatively thin veneer layers that are oriented such that the grain of the wood of each veneer layer is situated substantially perpendicular to an adjacent layer. Particleboard products are typically broken down into three categories, depending on the density of the board: particle board, medium density fiberboard, and hardboard.

LVL products are comparatively thick laminates of several veneer layers. LVL products are generally greater than 25 mm, and typically greater than 50 mm or more in final (cured) thickness. LVL laminates may often be 75 mm to 150 mm or more in final thickness. Typically, the direction of the grain of the wood of each veneer layer is situated in the same or substantially parallel direction to an adjacent veneer layer. In addition, LVL products may be used in demanding structural applications, such as roof beams, where bond quality is critical. The production of such high quality thick laminates is much more difficult with some resins than in the case of plywood because press times of many hours are required to produce the thickest LVL products, and such long press times are generally uneconomical.

However, other non-engineered wood products can be utilized as the base substrate of the laminated veneer product of the present invention. These non-engineered wood substrates can include solid wood pieces, sheet metal, plastic sheets, etc.

The laminated veneer products can be used for various applications in the residential and commercial building industries, and more particularly as floorboards, doors, cabinets, countertops, and walls, just to name a few.

EXAMPLES

The present invention may be better understood with reference to the following examples.

Example 1

A 5 mil base paper (available as 006B0 from Neenah Paper, Inc.) of softwood pulp fibers (available under the name NBSK from Bowater, Inc. of Greenville, S.C.) was saturated to 50 ppu (i.e., 50 parts of saturant add on per 100 parts of fiber) with a carboxylated styrene-butadiene latex (DL-240NA, Dow Reichhold Specialty Latex) containing an epoxy resin (Epi-Rez® 3510-W-60, Hexion Specialty Chemicals), an antioxidant (Bostex 24, Akron Dispersions), trisodium phosphate, and an iron oxide pigment. The weight percentages of the components of the saturated base paper are shown in Table 1:

TABLE 1

|  | Weight % |
| --- | --- |
| NBSK (Bowater, Inc.) | 66.7 |
| Dow DL-240 NA | 30.0 |
| Epi-Rez ® 3510-W-60 | 1.5 |
| Trisodium phosphate | 1.4 |
| Iron oxide pigment | 0.36 |
| Bostex 24 | 0.08 |

The saturated sheet was then coated on both sides with 34 gsm of an adhesive containing a carboxylated styrene-butadiene latex (DL-242NA, Dow Reichhold Specialty Latex) containing an epoxy resin (Epi-Rez® 3510-W-60, Hexion Specialty Chemicals), an antioxidant (Bostex 24, Akron Dispersions), and trisodium phosphate. The weight percentages of the components are shown in Table 2:

TABLE 2

|  | Weight % |
| --- | --- |
| Dow DL-242NA | 91.1 |
| Epi-Rez ® 3510-W-60 | 4.6 |
| Trisodium phosphate | 4.1 |
| Bostex 24 | 0.23 |

Figure 2:
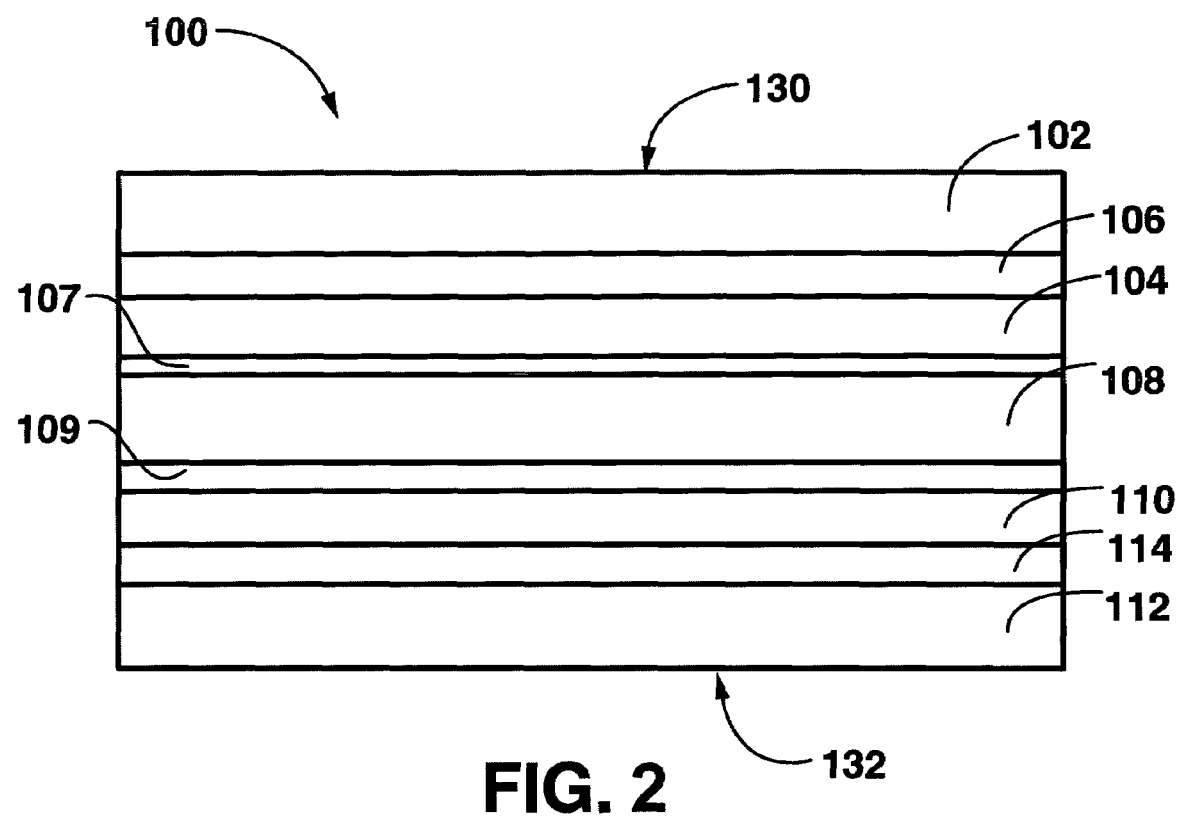
FIG. 2 is a cross-sectional view of a laminated veneer product of another exemplary embodiment of the present invention.

To produce the laminated veneer product of this example, the two birch veneers, the two coated and saturated paper backing sheets, and a plywood substrate were pressed together in the PHI hot press (Model 0230C-X!-4B-7, PHI-Tulip, City of Industry, Calif.) at 265° F. (about 129° C.) for 2 minutes at a pressure of 150 psi. The layers were arranged such as shown in the cross-section view of FIG. 2 of laminated veneer product 100. As shown, a first birch veneer 102 is adhered to a first paper backing sheet 104 via first adhesive layer 106. The first paper backing sheet 104 is laminated to a plywood substrate 108 via second adhesive layer 107. A second paper backing sheet 110 is laminated to the opposite surface of plywood substrate 108 via third adhesive layer 109. The second paper backing sheet 110 is adhered to the second birch veneer 112 via fourth adhesive layer 114. As shown, both birch veneer layers 102 and 112 define an outer facing surface 130 and 132, respectively, which provide a wood grain appearance to both outer surfaces of the laminated veneer product 100. After pressing, the veneers 102 and 112 were adhered well to the poplar core plywood substrate. After pressing, there was no color show through from the plywood substrate to the veneer.

Example 2

The same as Example 1 above except the backer sheet was coated on each side with 28 gsm of the adhesive coating.

Example 3

The same as Example 1 above except the backer sheet was coated on each side with 22.5 gsm of the adhesive coating.

Example 4

The same as Example 1 above except the backer sheet was coated on each side with 15 gsm of the adhesive coating.

Example 5

The same as Example 1 above except a pine core substrate was used.

Example 6

The same as Example 1 above except a particle board core substrate was used.

Control:

A control was made under the same conditions as described above, except that the paper backing sheet was a 5 mil premium beige C2S backer available under the designation 0641V0 from Neenah Paper, Inc. The 0641V0 backer was saturated with an acrylic latex binder. Also, the 0641V0 backer was coated with an acrylic latex adhesive coating. The adhesive coating contains a melamine formaldehyde crosslinker, available under the trade name Cymel 303 from Cytec Industries, Inc. of West Patterson, N.J. Both the saturant and adhesive acrylic latexes would evolve formaldehyde during cure because they contain methylolacrylamide monomer in the polymer backbone. Additionally, the Cymel 303 adds more formaldehyde to the adhesive coating. The control backing sheet was made of northern bleached softwood kraft (NBSK) base sheet.

Testing

The laminated panels of the control and Examples 1-6 were tested for water resistance using the ANSI/HPVA HP-1-2004 "Three-Cycle Soak Test" standard. The laminated veneer panels were cut into three approximately 2 inch by 2 inch square samples and soaked in water for four hours. After soaking, the laminated veneer samples were dried for 19 hours in an oven at 50° C. The water soaking and drying cycle were repeated three times for each sample. After each cycle, the laminated veneer samples were examined for any delamination of the veneer from the plywood substrate. After the first and second soak and dry cycles, no delamination occurred for either the samples of Example 1 or the control samples. Results of the Three Cycle Soak Test are shown below in Table 3:

TABLE 3

| Example | Result |
|---|---|
| Control | Fail |
| 1 | Pass |
| 2 | Pass |
| 3 | Pass |
| 4 | Fail |
| 5 | Pass* |
| 6 | Pass* |

*Test discontinued after 2 soak cycles.

As used in Table 3, a result of Pass indicates that no delamination occurred for the samples of that particular example. On the other hand, a result of Fail indicates that delamination occurred in at least one of the samples of that particular example. For example, after the third soak and dry cycle, there was no delamination of the samples of Example 1. However, after the third soak and dry cycle, one of the three pieces of the Control Sample had delamination on two edges. Thus the samples of Example 1 passed the "Three Cycle Soak Test" and the samples of the Control failed.

The invention claimed is:

1. A paper backed veneer comprising:
a veneer defining an inner surface;
a paper backing sheet laminated to said inner surface of said veneer, said paper backing sheet comprising a cellulosic nonwoven web saturated with a formaldehyde-free binder composition, wherein said binder composition comprises a first curable latex polymer and a first crosslinking agent, and a formaldehyde-free adhesive coating positioned between the paper backing sheet and the inner surface of the veneer, wherein the formaldehyde-free adhesive coating comprises a second curable latex polymer and a second crosslinking agent.

2. A paper backed veneer as in claim 1, wherein said first crosslinking agent comprises an epoxy resin.

3. A paper backed veneer as in claim 2, wherein the ratio of the amount of said first curable latex polymer to said first epoxy resin is from about 10:1 to about 1:2 by weight.

4. A paper backed veneer as in claim 1, wherein said first curable latex polymer is selected from the group consisting of polyacrylates, styrene-butadiene copolymers, ethylene-vinyl acetate copolymers, nitrile rubbers, acrylonitrile-butadiene copolymers, poly(vinyl chloride), poly(vinyl acetate), ethylene-acrylate copolymers, vinyl acetate-acrylate copolymers, neoprene rubbers, trans-1,4-polychloroprenes, cis-1,4-polyisoprenes, butadiene rubbers, cis- and trans-1,4-polybutadienes, and ethylene-propylene copolymers.

5. A paper backed veneer as in claim 1, wherein said first curable latex polymer comprises a stryene-butadiene copolymer.

6. A paper backed veneer as in claim 1, wherein said first curable latex polymer comprises a functionalized latex polymer.

7. A paper backed veneer as in claim 6, wherein said functionalized latex polymer comprises carboxyl groups.

8. A laminated veneer product comprising
a veneer defining an inner surface, wherein said veneer has a thickness of less than about 10 millimeters;
a paper backing sheet adhered to said inner surface of said veneer via a formaldehyde-free adhesive coating, said paper backing sheet comprising a cellulosic nonwoven web saturated with a formaldehyde-free binder composition, wherein said formaldehyde-free binder composition comprises a curable latex polymer and an epoxy resin present in a ratio of said curable latex polymer to said epoxy resin of from about 10:1 to about 1:2 by weight, and wherein said curable latex polymer comprises carboxyl groups, wherein the formaldehyde-free binder composition is saturated into the cellulosic nonwoven web at an add-on level of from about 10% to about 90%, and wherein the formaldehyde-free adhesive coating is present at a coating add-on level of from about 20% to about 150%; and
a base substrate adhered to an opposite surface of said paper backing sheet.

9. A laminated veneer product as in claim 8, wherein said formaldehyde-free adhesive coating comprises a curable latex polymer and an epoxy resin.

10. A laminated veneer product as in claim 9, wherein said curable latex polymer of said formaldehyde-free binder composition has a glass transition temperature of less than 20° C., and wherein said curable latex polymer of said formaldehyde-free adhesive coating has a glass transition temperature of greater than 20° C.

11. A laminated veneer product as in claim 8, wherein said curable latex polymer is selected from the group consisting of polyacrylates, styrene-butadiene copolymers, ethylene-vinyl acetate copolymers, nitrile rubbers, acrylonitrile-butadiene copolymers, poly(vinyl chloride), poly(vinyl acetate), ethylene-acrylate copolymers, vinyl acetate-acrylate copolymers, neoprene rubbers, trans-1,4-polychloroprenes, cis-1,4-polyisoprenes, butadiene rubbers, cis- and trans-1,4-polybutadienes, and ethylene-propylene copolymers.

12. A laminated veneer product as in claim 8, wherein said curable latex polymer comprises a stryene-butadiene copolymer including carboxyl groups.

13. A laminated veneer product as in claim 8, wherein said epoxy resin is produced from a reaction of epichlorohydrin and bisphenol-A.

14. A laminated veneer product as in claim 8, wherein said binder composition further comprises a phenol-type antioxidant.

15. A laminated veneer product as in claim 8, wherein said base substrate comprises an engineered wood product.

16. A laminated veneer product as in claim 8, wherein said curable latex polymer comprising carboxyl groups is a copolymer of a vinyl aromatic monomer, an unsaturated carboxylic acid monomer, and a diene monomer.

17. A laminated veneer product as in claim 16, wherein said vinyl aromatic monomer comprises styrene and wherein said diene monomer comprises butadiene.

18. A laminated veneer product as in claim 8, wherein the formaldehyde-free adhesive coating is present at a coating add-on level of from about 40% to about 100%.

* * * * *